(12) United States Patent
Handley et al.

(10) Patent No.: US 8,908,201 B2
(45) Date of Patent: Dec. 9, 2014

(54) SYSTEM AND METHOD FOR FILTERING NON-ACTIONABLE ALERTS IN A MANAGED PRINT SERVICE

(75) Inventors: John C. Handley, Fairport, NY (US); Beilei Xu, Penfield, NY (US); Jeremy Lee Reitz, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 853 days.

(21) Appl. No.: 13/012,274

(22) Filed: Jan. 24, 2011

(65) Prior Publication Data

US 2012/0188592 A1 Jul. 26, 2012

(51) Int. Cl.
*G06K 15/00* (2006.01)
*G06F 3/12* (2006.01)

(52) U.S. Cl.
CPC .............. *G06F 3/1285* (2013.01); *G06F 3/121* (2013.01); *G06F 3/1234* (2013.01); *G06F 3/1204* (2013.01); *G06F 3/1288* (2013.01)
USPC ............................ 358/1.14; 358/1.15; 399/27

(58) Field of Classification Search
USPC ..................................... 702/34; 715/201, 500
See application file for complete search history.

(56) References Cited

U.S. PATENT DOCUMENTS

| | | | | |
|---|---|---|---|---|
| 5,740,490 A * | 4/1998 | Yamashita et al. | ................ | 399/8 |
| 5,797,061 A * | 8/1998 | Overall et al. | ................. | 399/27 |
| 5,802,420 A * | 9/1998 | Garr et al. | ....................... | 399/27 |
| 6,556,926 B1 * | 4/2003 | Haines | ........................... | 702/34 |
| 6,744,527 B1 * | 6/2004 | Dorsey et al. | ................ | 358/1.14 |
| 6,912,366 B1 * | 6/2005 | Yamamoto et al. | ............ | 399/27 |
| 2003/0112457 A1 * | 6/2003 | Akiyama et al. | ............ | 358/1.14 |
| 2003/0135431 A1 * | 7/2003 | Schwartz et al. | .............. | 705/28 |
| 2003/0139982 A1 * | 7/2003 | Schwartz et al. | .............. | 705/28 |
| 2004/0168116 A1 * | 8/2004 | Shikata | ........................ | 715/500 |
| 2004/0187028 A1 * | 9/2004 | Perkins et al. | ............... | 713/201 |
| 2006/0039707 A1 * | 2/2006 | Mima | ............................. | 399/27 |
| 2006/0056872 A1 * | 3/2006 | Hosoi | ............................. | 399/81 |
| 2006/0164674 A1 * | 7/2006 | Someno | ....................... | 358/1.14 |
| 2007/0292145 A1 * | 12/2007 | Drose et al. | ....................... | 399/9 |
| 2008/0124093 A1 * | 5/2008 | Kai | .................................. | 399/9 |
| 2010/0103824 A1 * | 4/2010 | Gilmour | ...................... | 358/1.15 |

* cited by examiner

*Primary Examiner* — Nicholas Pachol
(74) *Attorney, Agent, or Firm* — Fox Rothschild LLP

(57) ABSTRACT

Methods and systems of filtering non-actionable alerts are disclosed. A processing device receives an alert from a printing device and determines a page count for the printing device. The processing device compares the page count with at least one threshold value associated with the alert and the printing device. In response to the page count satisfying the at least one threshold value, the processing device identifies the alert as a valid alert.

11 Claims, 8 Drawing Sheets

SYSTEM AND METHOD FOR FILTERING NON-ACTIONABLE ALERTS IN A MANAGED PRINT SERVICE

BACKGROUND

A managed print service is used to manage the operation of printing devices, such as printers, scanners, copiers, multi-function devices and/or the like, in a unified fashion. The managed print service can permit an enterprise to outsource management of its hardcopy devices to an external vendor, which allows the enterprise to focus on its core business.

Managed print services often provide supplies to an enterprise customer for replenishment of consumables, such as toner, ink, drive motor belts or other belts, nip wheels, light sources and/or the like. When a printing device needs to have a consumable item replaced, the printing device can send an alert to a customer care center for a managed print service. Typically, such alerts are generated based on software and/or hardware within a printing device. Such alerts identify conditions within a printing device, such as when the amount of a consumable drops below a threshold. Alternately, a customer can call the customer care center to place an order for a consumable. In addition, the customer can make a request through a web portal to the customer care center for a consumable to be replaced.

One problem with alerts is that many alerts are cancelled upon review by the customer care center because the consumable is not actually needed by the printing device. Faulty alerts waste customer care center resources and raise the overall cost of providing the managed print service.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system for filtering non-actionable alerts in a managed print service includes a processing device and a processor-readable storage medium in operable communication with the processing device. The processor-readable storage medium contains one or more programming instructions that, when executed, cause the processing device to receive an alert from a printing device, determine a page count for the printing device, compare the page count with at least one threshold value associated with the alert and the printing device, and, in response to the page count satisfying the at least one threshold value, identify the alert as a valid alert.

In an embodiment, a system for filtering non-actionable alerts includes a processor-readable storage medium for storing a plurality of alerts received from a plurality of printing devices, where each alert includes a page count and device model information for a printing device from which the alert is received, and a processing device, in operable communication with the processor-readable storage medium. The processing device is configured to select a subset of the alerts, where each alert in the subset is associated with a printing device having the same device model information, determine maximum likelihood estimates for a plurality of mean values and maximum likelihood estimates for a plurality of covariance values of the page counts associated with the alerts in the subset, where each mean value is associated with a covariance value, and where each associated mean value and covariance value identify a Gaussian function, calculate a determinant value for the maximum likelihood estimates, in response to the determinant value being less than a minimum determinant value, store the maximum likelihood estimates for the mean values and the maximum likelihood estimates for the covariance values, and replace the minimum determinant value with the determinant value, repeat the select, determine, calculate, store and replace operations a plurality of times, and determine at least one threshold value based on the stored maximum likelihood estimates for the mean values and the maximum likelihood estimates for the covariance values.

In an embodiment, a method of filtering non-actionable alerts includes receiving, by a processing device, an alert from a printing device, determining, by the processing device, a page count for the printing device, comparing, by the processing device, the page count with at least one threshold value associated with the alert and the printing device, and, in response to the page count satisfying the at least one threshold value, identifying, by the processing device, the alert as a valid alert.

DETAILED DESCRIPTION

The following terms shall have, for the purposes of this application, the respective meanings set forth below.

A "printing device" refers to a device capable of performing one or more print-related functions. For example, a printing device may include a printer, a scanner, a copy machine, a multifunction device or other similar equipment. A "multifunction device" is a device that is capable of performing two or more distinct print-related functions. For example, a multifunction device may have print and scan capabilities.

An "alert" refers to a notification pertaining to a device that identifies an error condition and/or a threshold condition. For example, a printing device may transmit a notification regarding an error condition that occurs within the device. Alternately, the printing device may transmit a notification that a threshold has been passed or surpassed. An exemplary threshold may be a level of a consumable within the printing device. If the level of a consumable drops below a threshold, an alert may be transmitted from the printing device to a monitoring station at a customer care center for a managed print service to determine how to respond to the low consumable condition.

A "consumable" refers to a portion of a device that is used or degrades as the device performs particular operations. For example, a printing device may include a plurality of consumables, such as toner, ink, drive motor belts or other belts, nip wheels, light sources, oil or any other lubricant used for any purpose and/or the like.

As used herein, the term "page count" shall be construed broadly to include, without limitation, a number of physical pages, a number of impressions, a number of images printed on a continuous web, a number of sides on a printed package, or a number of prints in "n-up" arrangements for book binding and the like.

Figure 1:
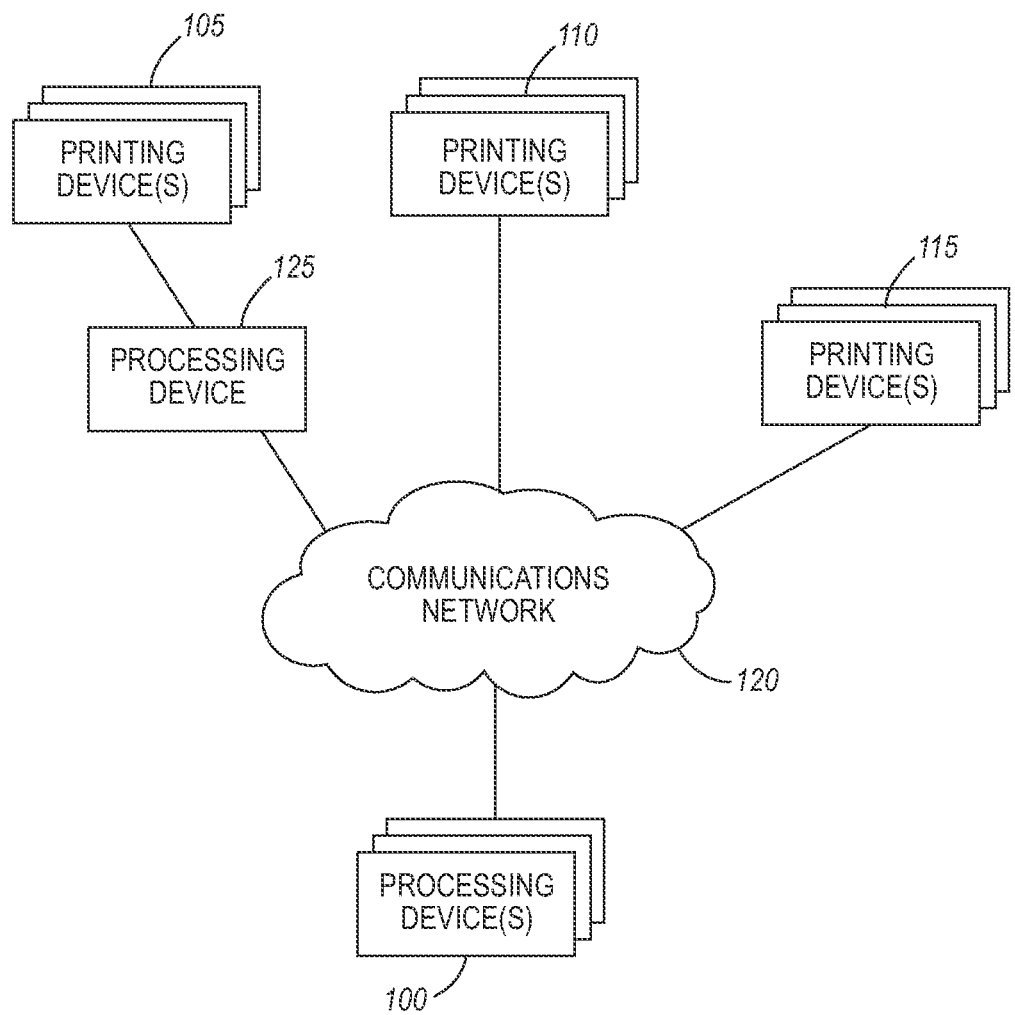
FIG. 1 depicts a block diagram of exemplary devices forming and controlled by a managed print service according to an embodiment.

The present disclosure describes methods and systems for performing statistical analysis for processing and classifying alerts coming from devices, such as printing devices. FIG. 1 depicts a block diagram of exemplary devices forming and controlled by a managed print service according to an embodiment. As shown in FIG. 1, the managed print service may include one or more processing devices 100, 125, one or more pluralities of printing devices, such as 105, 110, 115, and a communications network 120. A managed print service operator may operate the one or more processing devices 100 at a location remote from the pluralities of printing devices 105-115, such as a customer care center for a managed print service. In an alternate embodiment, at least one processing device, such as 125, may be located in proximity to a plurality of printing devices, such as 105. The one or more processing devices 100, 125 may receive information pertaining to the operation of the pluralities of printing devices 105-115 intermittently or periodically. The one or more processing devices 100, 125 may provide information to a managed print service operator regarding whether a printing device exhibits an alert condition. In addition, the one or more processing devices 100, 125 may receive, store and/or provide information to the managed print service operator regarding page counts or other print volumes, machine status, requests for service or supplies, usage information, as well as billing information, for each of the pluralities of printing devices 105-115. The one or more processing devices 100, 125 may include or be in operable communication with a tangible storage medium storing executable instructions and/or data used for processing information received from the printing devices 105-115. An exemplary processing device 100, 125 is disclosed in reference to FIG. 6 below.

Each plurality of printing devices 105-115 may be located at a client location and may include printing devices of various types (i.e., models). Alternately, a plurality of printing devices, such as 105, may correspond to an enterprise including a plurality of client locations. Each printing device, as part of its operation, may monitor and transmit status information, such as page counts or other print volumes, machine status, requests for service and/or supplies, usage information, timing information and/or the like. This status information may be transmitted to the one or more processing devices 100, 125 as part of the managed print service.

Data transmissions within the managed print service may be performed via the communications network 120. The communications network 120 may include the Internet, one or more intranets, one or more local area networks (LANs), one or more wide area networks (WANs), one or more wireless local area networks (WLANs), and the like. In particular, transmissions may be sent from each printing device 105-115 or processing device 125 to the one or more processing devices 100 via the communications network 120.

In an embodiment, a processing device 125 may be located with at least one of the pluralities of printing devices, such as 105. In such an embodiment, the processing device 125 may receive information from the plurality of printing devices 105, determine whether an alert condition is exhibited, and forward an alert to one or more processing devices 100 at a managed print service. The one or more processing devices 100 at the managed print service may provide information to a managed print service operator regarding whether a printing device exhibits an alert condition based on the information received from the processing device 125 located with a plurality of printing devices, such as 105.

Figure 2:
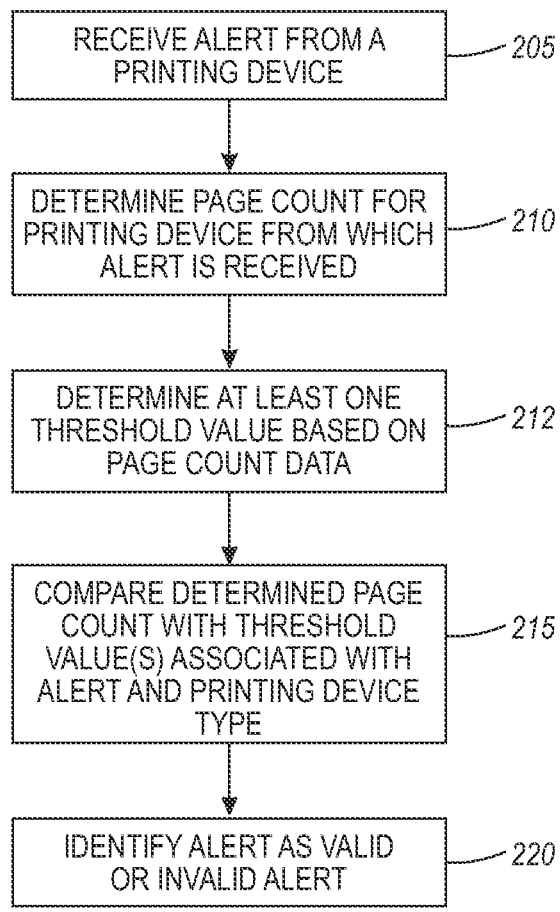
FIG. 2 depicts a flow diagram of an exemplary process for filtering non-actionable alerts according to an embodiment.

FIG. 2 depicts a flow diagram of an exemplary process for filtering non-actionable alerts according to an embodiment. As shown in FIG. 2, a processing device may receive 205 an alert from a printing device. In an embodiment, the alert may identify that the printing device has a low level of a consumable. Although the embodiments described herein pertain to low consumable alerts, other types of error or status conditions generating alerts are also intended to be encompassed within the scope of this disclosure. In an embodiment, the processing device may be located at a managed print service. In an alternate embodiment, the processing device may be located at a location at which the printing device is located. In yet another embodiment, the processing device may be operably connected to the printing device by a communications network, such as the Internet, an intranet, a wireless network or the like.

In a managed print service, an alert can be transmitted by a printing device in error. The hardware and software within a printing device and the vast number of different alerts for other consumables can sometimes be mistakenly reported as an alert for a particular low consumable. As a result, a sequence of legitimate low consumable alerts may be obscured by one or more alerts generated by other software/hardware problems. In other words, false positive low consumable alerts may result. In order to better determine whether the alert received 205 from the printing device is accurate, statistical modeling may be performed.

A page count may be determined 210 for the printing device from which the alert is received. In an embodiment, the page count may be determined 210 by receiving a page count from the printing device that represents the number of pages on which the printing device has performed an operation related to the alert since the component generating the alert was replaced. For example, if the alert is for low toner, the page count may be reset (either automatically or by a person performing the replacement) when a toner cartridge is replaced; and the page count may then increment each time a page is printed using toner from the toner cartridge.

In an alternate embodiment, the page count may be determined 210 by receiving a page count representing a current page count for the printing device. The current page count may represent a number of pages on which the printing device has performed an operation related to the alert during, for example, the printing device's lifetime. The difference between the current page count and a stored page count representing a page count as of the time at which the component generating the alert was last replaced may be determined 210. This determined difference is the page count since the last replacement of the component for which the alert was received 205.

The determined page count may then be compared 215 with at least one threshold value associated with the alert and the printing device. For each type of printing device, at least one threshold value may be associated with the alert. The one or more threshold values may be stored in a storage medium in operable communication with a processing device. In an embodiment, the at least one threshold value may be determined 212 based on historical page count data for the printing device. In an embodiment, the historical page count data may include page count data for all printing devices of the same type as the printing device from which the alert is received 205. The threshold value may be updated periodically or intermittently as processing devices receive alerts pertaining to the consumable.

Figure 3:
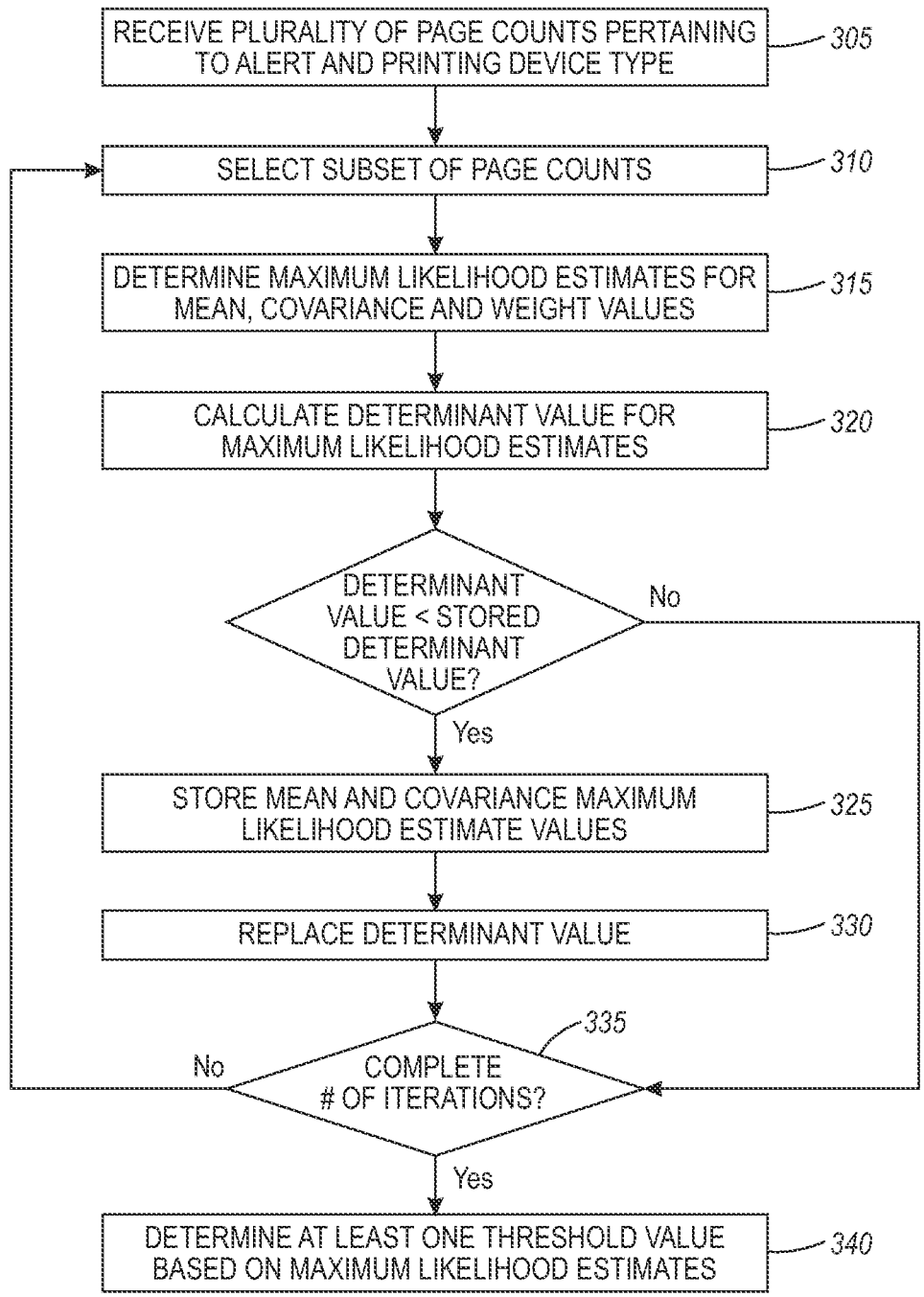
FIG. 3 depicts a flow diagram for an exemplary method of determining at least one threshold value associated with an alert and a printing device according to an embodiment.
Figure 4A:
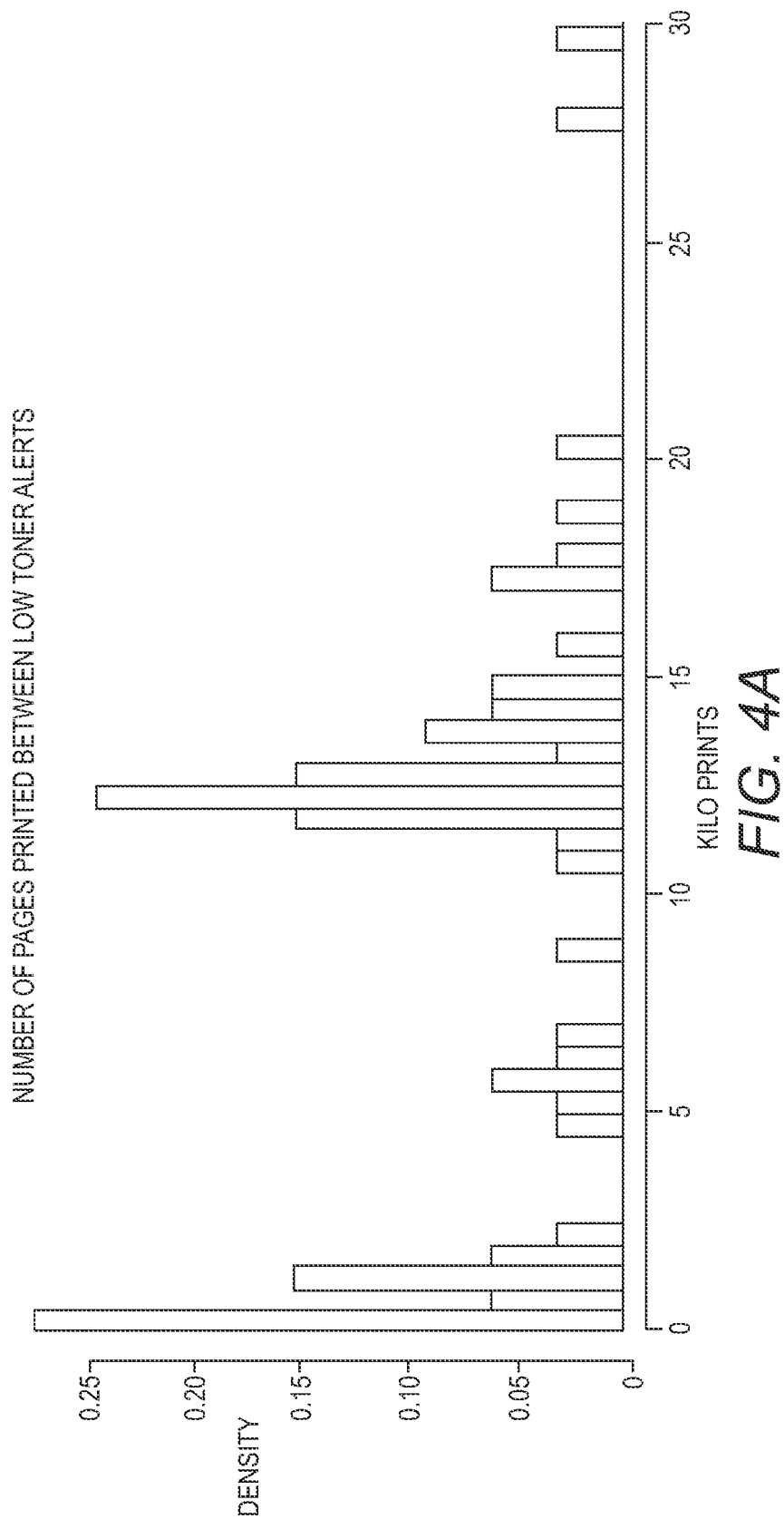
FIG. 4A depicts an exemplary frequency histogram of page counts between alerts for printing devices of a particular type according to an embodiment.

FIG. 3 depicts a flow diagram for an exemplary method of determining 212 at least one threshold value associated with an alert and a printing device according to an embodiment. As shown in FIG. 3, a processing device may receive 305 a plurality of page counts pertaining to a particular alert for a plurality of printing devices over a period of time. In an embodiment, the plurality of printing devices for which the plurality of page counts are received 305 are each the same type or model as the printing device from which the alert was received 205. A histogram of exemplary page counts for a particular type of printing device and a particular alert is depicted in FIG. 4A.

A mixture of Gaussians may be used to determine the at least one threshold value. A mixture of Gaussians with K components takes the following form:

$$f(x; \mu_1, \ldots, \mu_K, \sigma_1^2, \ldots, \sigma_K^2, \alpha_1, \ldots, \alpha_K) = \sum_{k=1}^{K} \alpha_k \phi(x; \mu_k; \sigma_k^2),$$

where: $\phi(x; \mu_K; \sigma_K^2)$ is, for example, a Gaussian or normal distribution with mean $\mu_k$ and covariance $\sigma_k^2$; $\alpha_k > 0$ for $k=1, \ldots, K$ and $$\sum_{k=1}^{K} \alpha_k = 1.$$

Accordingly, the mixture of Gaussians includes 3K−1 parameters.

The value of the likelihood function for a mixture of Gaussians is numerically complicated by the sum in the density. This sum prevents simplification by taking a logarithm. Thus, letting $x_1, \ldots, x_n$ be a random sample from f, the likelihood function can be expressed as:

$$\prod_{i=1}^{n} f(x_i; \mu_1, \ldots, \mu_K, \sigma_1^2, \ldots, \sigma_K^2, \alpha_1, \ldots, \alpha_K) =$$

$$\prod_{i=1}^{n} \sum_{k=1}^{K} \alpha_k \phi(x_i; \mu_k; \sigma_k^2).$$

Estimating values for the likelihood function can be problematic when outlier values are present. To ameliorate the effect of outlying values, a subset of the page counts may be selected 310. In an embodiment, approximately 80% of the total number of page count values for the particular type of printing device may be selected 310. In an alternate embodiment, a different percentage or absolute number of the page count values of the total number of page count values for the particular type of printing device may be selected 310. In an embodiment, selection 310 of the page counts may be performed by selecting the subset of page counts from the plurality of page counts randomly or pseudorandomly.

Maximum likelihood estimates for the mean and covariance values of the likelihood function may then be determined 315, where each mean value is associated with a covariance value, and each associated mean and covariance value identify a Gaussian. In addition, maximum likelihood estimates for a weight associated with each Gaussian, $\alpha_k$, may be determined 315.

In an embodiment, values for the likelihood function can be estimated using the Expectation-Maximization method (the EM method). The EM method is an iterative procedure in which each of the plurality of page counts are assigned to one of the K distributions. In an embodiment, each of the plurality of page counts may be randomly or pseudorandomly assigned to one of the K distributions. The maximum likelihood estimates of the parameters for each distribution are then determined. Based on the determined estimates, an expected class is assigned to each of the plurality of page counts. The process is then repeated until assignments of page counts to each class converge. The above steps are represented as follows:

Let $z_{i,k}=1$ if $x_i$ belongs to class k, and 0 otherwise. In addition, each $z_{i,k}$ belongs to only one class (i.e., $\sum_{i=1}^{N} \sum_{k=1}^{K} z_{i,k}=n$). Let $n_k = \sum_{i=1}^{n} z_{i,k}$ (i.e., the number of data points assigned to each class $k=1, \ldots, K$).

The maximization step involves determining the following values:

$$n_k = \sum_{i=1}^{n} z_{i,k},$$

$$\hat{\mu}_k = \frac{1}{n_k} \sum_{i=1}^{n} x_i z_{i,k}$$

(the maximum likelihood estimates of the means), and $$\hat{\sigma}_k^2 = \frac{1}{n_k} \sum (x_i - \hat{\mu}_k)^2,$$

$k=1, \ldots, K$ (the maximum likelihood estimates of the covariance values).

The estimation step involves determining the following value:

$$z_{i,k} = \frac{\hat{\alpha}_k \phi_k(x_i; \hat{\mu}_k; \hat{\sigma}_k^2)}{\sum_{l=1}^{K} \hat{\alpha}_l \phi(x_i; \hat{\mu}_l, \hat{\sigma}_l^2)}$$

($\hat{\alpha}_k$=the maximum likelihood estimates of the weights for each Gaussian).

The maximization step and the estimation step are alternated until a convergence criterion is met or a maximum allowable number of iterations is exceeded. An exemplary convergence criterion may be for the log likelihood from step m to differ in absolute value from the log likelihood from step m+1 by a small amount $\epsilon$. Other convergence criteria may also be used within the scope of this disclosure. In addition, alternate methods of determining 315 the maximum likelihood estimates for the likelihood function may be used within the scope of this disclosure.

A determinant value for the maximum likelihood estimates may then be calculated 320. In an embodiment, the determinant value may be calculated 320 using the following expression:

$$v = \sum_{k=1}^{K} \hat{\alpha}_k \hat{\sigma}_k^2.$$

In a first iteration, the maximum likelihood estimates for the mean values and covariance values may be stored 325, and a determinant value may be stored. In subsequent iterations, if the currently determined determinant value is less than the stored determinant value, the maximum likelihood estimates for the mean values and covariance values may be stored 325, and the currently determined determinant value may replace 330 the stored determinant value.

The selecting 310, determining 315, calculating 320, storing 325 and replacing 330 operations may be repeated 335 a plurality of times or until a convergence criterion is achieved. After the operations are repeated 335 an appropriate number of times, the at least one threshold value may be determined 340 based on the stored maximum likelihood estimates for the mean values and the stored maximum likelihood estimates for the covariance values.

In an embodiment, the at least one threshold value may be determined 340 by determining a number of parts that can be used in the printing device to perform the operation for which the alert was received 205. For example, with respect to the histogram shown in FIG. 4A, a low toner alert may occur in a printing device that can use two different toner cartridges rated at 7000 pages and 14000 pages. As such, the determined number of parts may be two. A number of Gaussians for the mixture of Gaussians may then be determined based on the number of parts. In an embodiment, the number of Gaussians may be determined to be two more than the number of parts (i.e., four, in this example) in order to define a Gaussian for erroneous low alerts, a Gaussian for each of the different parts and a Gaussian for false high alerts. Other methods of selecting a number of Gaussians may be used within the scope of this disclosure.

Figure 4B:
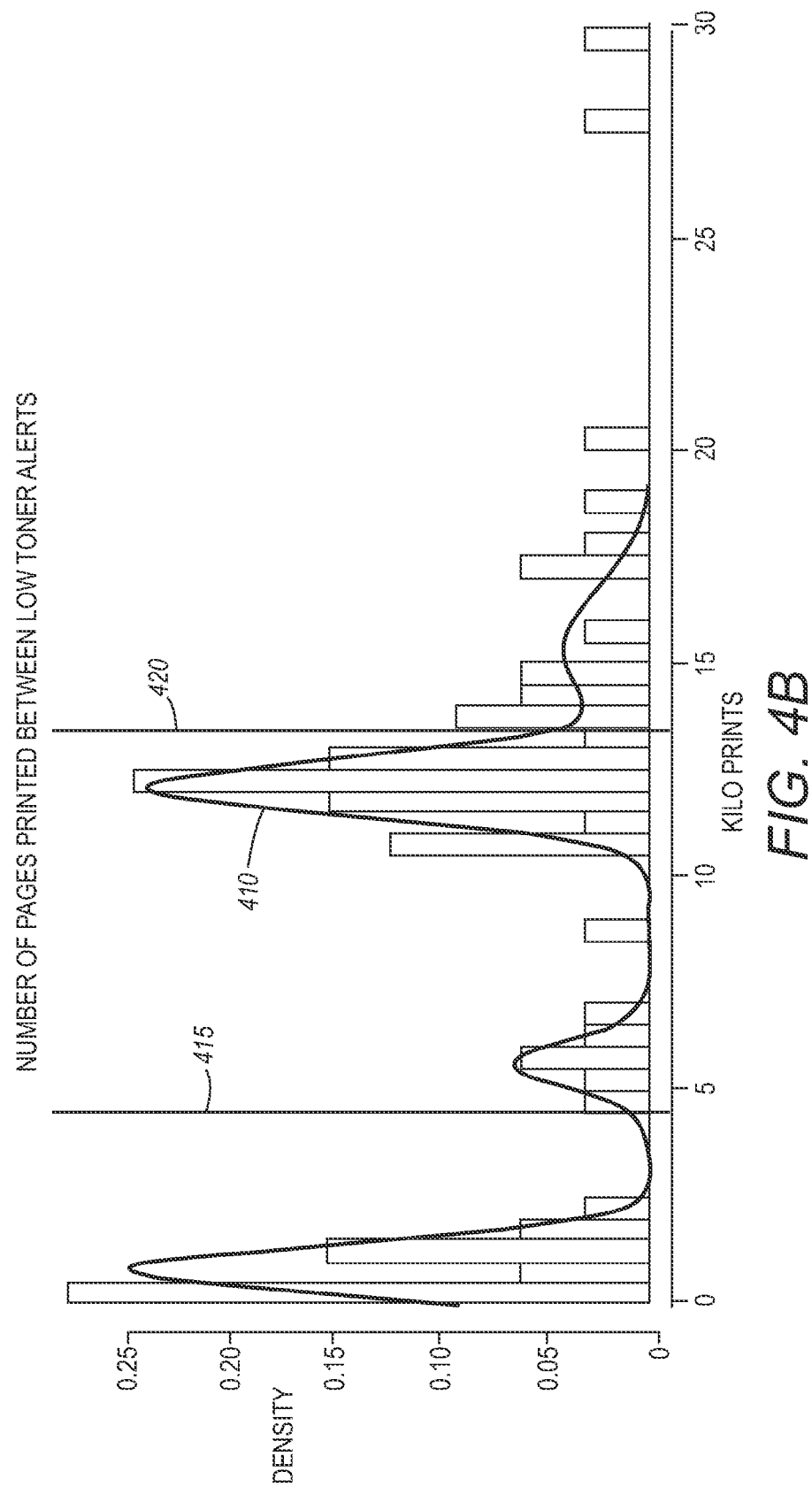
FIG. 4B depicts the frequency histogram of FIG. 4A fitted with a four component mixture of Gaussians according to an exemplary method disclosed herein.

Using the mixture of Gaussians method disclosed above in reference to FIG. 3, maximum likelihood estimates for the mean values, the covariance values and the weights may be determined based on the page counts associated with the particular alert and the particular type of printing device. For example, with respect to the histogram in FIG. 4A, the maximum likelihood estimates of the mean values may be determined to be 0.837, 5.653, 12.103, and 15.298 (1000s of pages), the weights may be determined to be 0.37, 0.10, 0.39 and 0.15 and the covariance values may be determined to be 0.340, 0.344, 0.428 and 1.972 for each of the four Gaussians, respectively. The highest and lowest Gaussians may be determined to represent the outlying values and may be discarded. Accordingly, low and high detection thresholds may be determined to be $\Phi^{-1}(0.05; \mu 5.653; \sigma^2=0.344)=4.371$ and $\Phi^{-1}(0.95; \mu=12.103; \sigma^2=0.428)=13.385$, respectively, where $\Phi^{-1}(c; \mu; \sigma^2)$ is the inverse Gaussian, and c is the cumulative probability of a data point in the Gaussian being less than the output value. The plot 410 of the mixture of Gaussians and the threshold values, 415 and 420, for the histogram of FIG. 4A are depicted in FIG. 4B.

In an alternate embodiment, the at least one threshold value may be determined 340 using page counts and additional variables, such as time, area coverage, or the like in the mixture of Gaussians model. For example, false low-toner alerts may occur with very short time intervals between alerts. As such, the mixture of Gaussians model may be represented by a joint distribution of page counts and, for example, time.

Figure 5A:
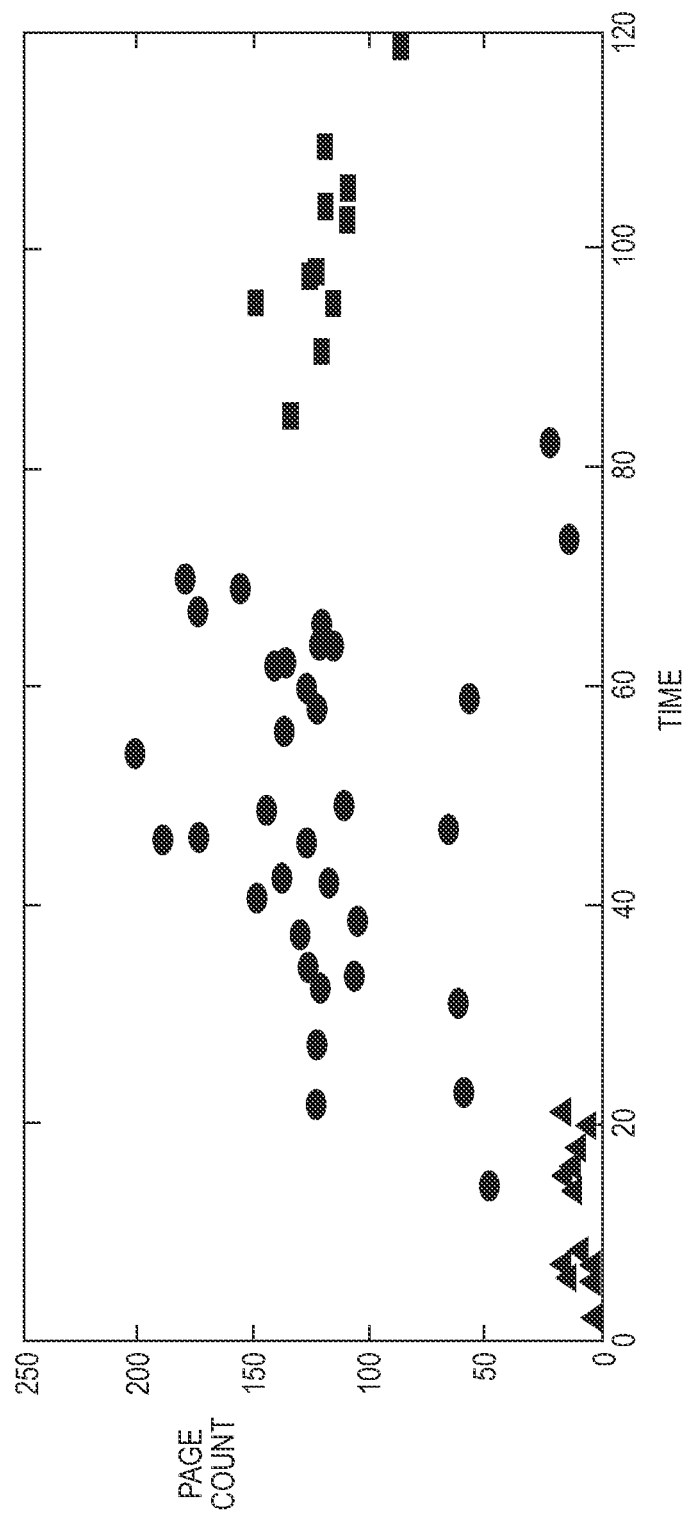
FIG. 5A depicts an exemplary plot of page count vs. time for exemplary alerts for printing devices of a particular type according to an embodiment.

FIG. 5A depicts an exemplary plot of page count vs. time for exemplary alerts for printing devices of a particular type according to an embodiment. As shown in FIG. 5A, each of the plotted points represents a page count and a time for an alert. The two-dimensional distribution can be defined using a mean vector and a covariance matrix. In estimating these values, a robust statistical procedure (i.e., a procedure that is not perturbed significantly by outlying data points) may be used to compute the distribution. The robust statistical procedure may enable the determination of alerts having outlying page count and time values. The covariance matrix and estimated mean vector are two examples of robust estimators because they are largely unaffected by outlying data points.

Once determined, the estimated covariance matrix $\hat{\Sigma}$ and estimated mean $\hat{\mu}$ can be used to determine a distance from the center point for each alert. This distance may be the Mahalanobis distance for the alert:

$$d(x, \hat{\mu}) = (x - \hat{\mu})^T \hat{\Sigma}^{-1} (x - \hat{\mu}).$$

The Mahalanobis distance is scaled in different directions according to the variance in that direction.

Figure 5B:
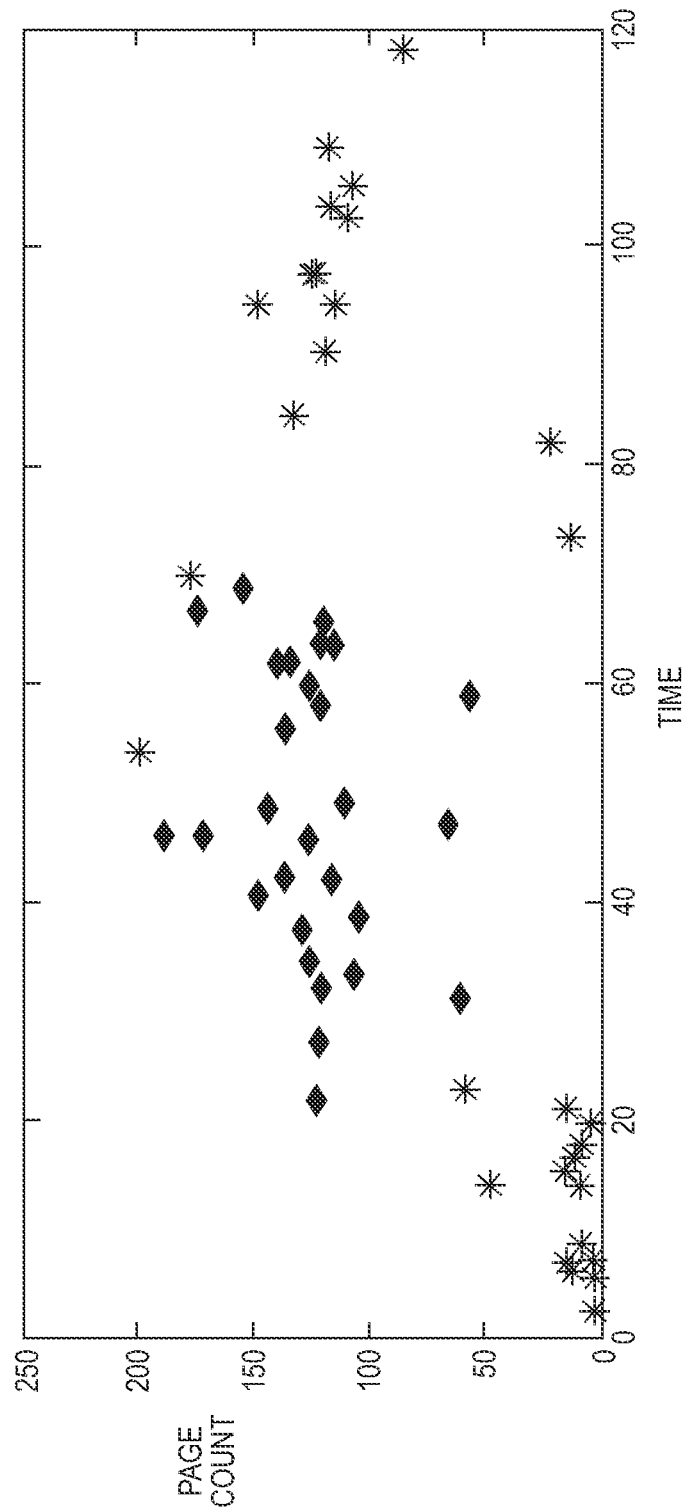
FIG. 5B depicts the plot of FIG. 5A fitted with a mixture of joint Gaussians of page count and time clustered to identify in-range and out-of-range alerts according to an embodiment.

FIG. 5B depicts the plot of FIG. 5A fitted with a mixture of joint Gaussians of page count and time clustered to identify in-range and out-of-range alerts according to an embodiment. The alerts may be classified into alerts that are in-range and alerts that are out-of-expected range (either too low page count/too soon or too high page count/too long) based on the Mahalanobis distance for each alert (the distance that each alert is from a majority mean). As shown in FIG. 5B, the in-range alerts may be represented with a diamond shape, and an out-of-expected range alert may be represented with an asterisk. If only low page counts are of concern to the managed print service, an alert satisfying a separate page count threshold may be denoted as an in-range alert.

It will be apparent to one of ordinary skill in the art that different variables and/or additional variables may be considered within the scope of this disclosure. This disclosure is not intended to be limiting with respect to the selected variables, but merely uses the selected variables by way of example.

Referring back to FIG. 2, if a page count associated with the received alert satisfies the at least one threshold value, the alert may be identified 220 as a valid alert. For example, based on the threshold values, 415 and 420, identified in FIG. 4B, an received alert having a page count with between 4,371 and 13,385 pages may be identified 220 as valid. Conversely, a received alert with a corresponding page count of less than 4,371 pages may be rejected as being false, and a received alert with a corresponding page count of more than 13,385 pages may be flagged as a suspicious event.

Figure 6:
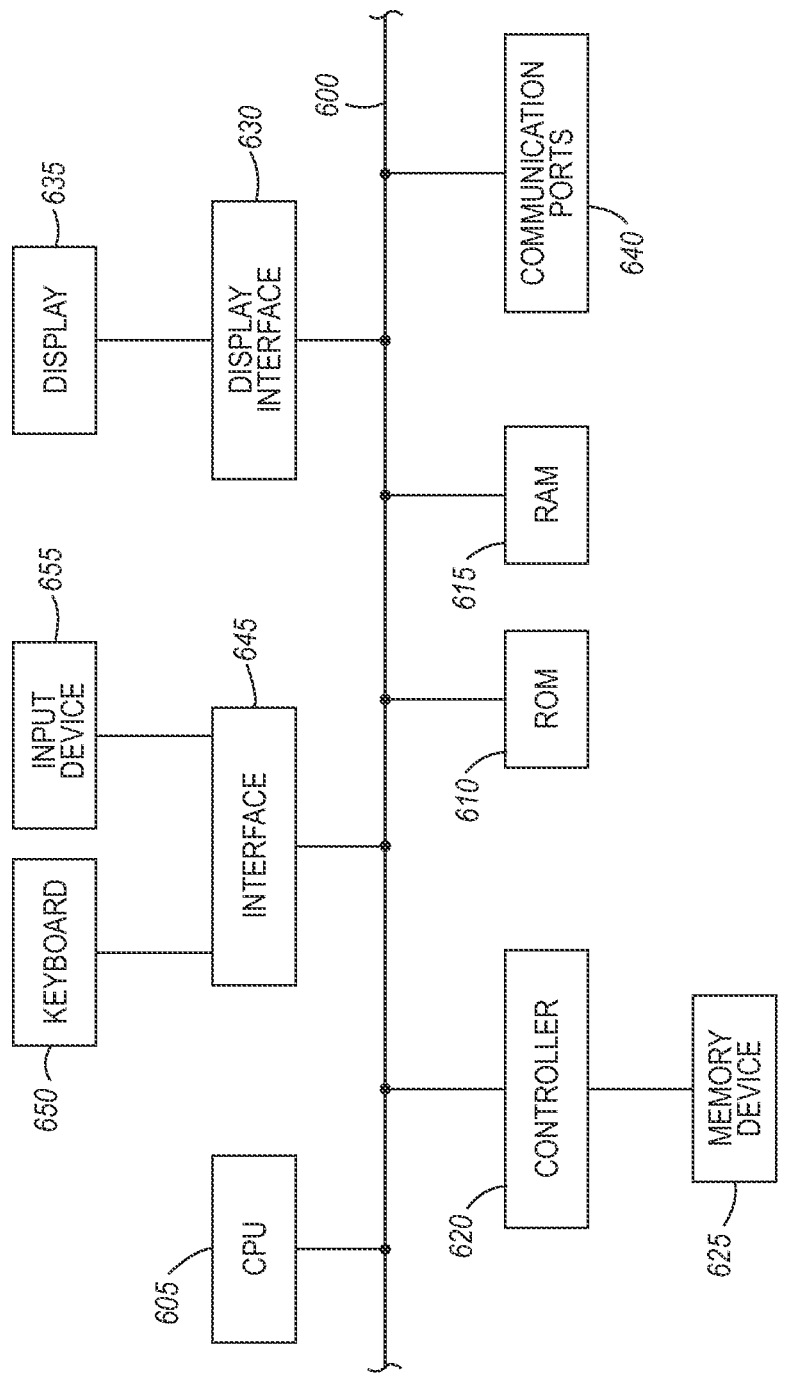
FIG. 6 depicts a block diagram of exemplary internal hardware that may be used to contain or implement program instructions according to an embodiment.

FIG. 6 depicts a block diagram of exemplary internal hardware that may be used to contain or implement program instructions, such as the process steps discussed above in reference to FIGS. 1 and 2, according to an embodiment. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an exemplary processing device, computing device or processor as such terms are used within this disclosure. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 630 may permit information from the bus 600 to be displayed on the display 635 in audio, visual, graphic or alphanumeric format. Communication with external devices, such as a printing device, may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for filtering non-actionable alerts in a managed print service, the system comprising:
a processing device; and
a processor-readable storage medium in operable communication with the processing device,
wherein the processor-readable storage medium contains one or more programming instructions that, when executed, cause the processing device to:
receive an alert from a printing device,
determine whether the received alert is a valid alert or a false-positive alert by:
determining page count data for the printing device, wherein the page count data comprises one or more page count values, wherein the one or more page count values comprise one or more outliers,
determining an ultimate threshold value associated with the alert and the printing device by:
randomly identifying a plurality of subsets of the page count data, wherein each subset comprises a same amount of page count values, for each identified subset:
determining a mixture of Gaussian estimates of mean and covariance for the subset, and
identifying one or more threshold values from the estimates, and
selecting the threshold value having a smallest covariance determinant as the ultimate threshold value,
comparing the page count with the ultimate threshold value associated with the alert and the printing device,
in response to the page count satisfying the ultimate threshold value, identify the alert as a valid alert, and
in response to the page count not satisfying the at least one threshold value, identify the alert as a false-positive alert.

2. The system of claim 1 wherein the alert pertains to a remaining level of a consumable.

3. The system of claim 1 wherein the one or more programming instructions that cause the processing device to determine a page count comprise one or more programming instructions that, when executed, cause the processing device to receive a page count from the printing device.

4. The system of claim 1 wherein the one or more programming instructions that cause the processing device to determine a page count comprise one or more programming instructions that, when executed, cause the processing device to:
receive a current page count from the printing device; and
determine the page count to be the difference between the current page count and a stored page count for the printing device.

5. The system of claim 1 wherein the processor-readable storage medium further contains one or more programming instructions that, when executed, cause the processing device to determine the at least one threshold value based on historical page count data for the printing device.

6. The system of claim 1, wherein the one or more programming instructions that, when executed, cause the processing device to randomly identify a plurality of subsets of the page count data comprise one or more programming instructions that, when executed, cause the processing device to randomly identify a plurality of subsets of the page count data, wherein each subset comprises 80% of the page count values.

7. A method of filtering non-actionable alerts, the method comprising:
receiving, by a processing device, an alert from a printing device;
determining, by the processing device, whether the received alert is a valid alert or a false-positive alert by:
determining page count data for the printing device, wherein the page count data comprises one or more page count values, wherein the one or more page count values comprise one or more outliers,
determining an ultimate threshold value associated with the alert and the printing device by:
randomly identifying a plurality of subsets of the page count data, wherein each subset comprises a same amount of page count values,
for each identified subset:
determining a mixture of Gaussian estimates of mean and covariance for the subset, and
identifying one or more threshold values from the estimates, and
selecting the threshold value having a smallest covariance determinant as the ultimate threshold value,
comparing the page count with the ultimate threshold value associated with the alert and the printing device, in response to the page count satisfying the ultimate threshold value, identifying the alert as a valid alert, and in response to the page count not satisfying the at least one threshold value, identify the alert as a false-positive alert.

8. The method of claim 7 wherein the alert pertains to a remaining level of a consumable.

9. The method of claim 7 wherein the determining a page count comprises:

receiving a page count from the printing device.

10. The method of claim 7 wherein the determining a page count comprises:

receiving a current page count from the printing device; and determining the page count to be the difference between the current page count and a stored page count for the printing device.

11. The method of claim 7 wherein the method further comprises:

determining, by the processing device, at least one threshold value based on historical page count data for the printing device.

\* \* \* \* \*